April 6, 1943.                R. R. BLAIR                2,316,044
                         ELECTRONIC APPARATUS
                          Filed Oct. 18, 1941
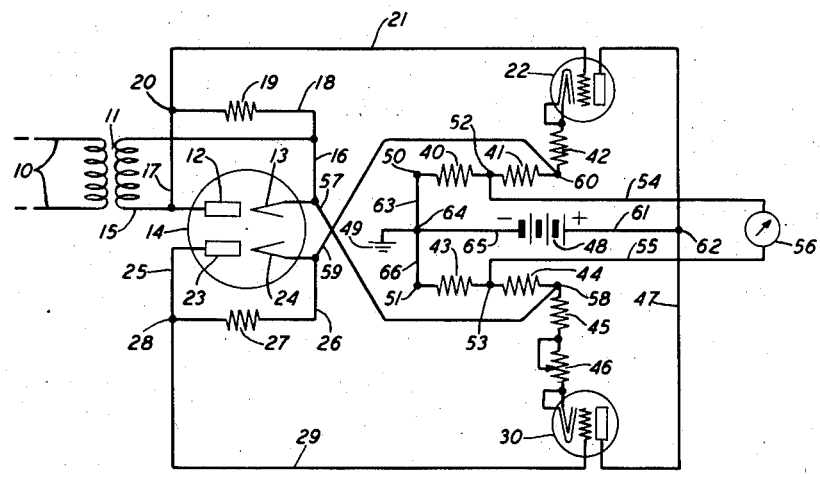
                                                    INVENTOR
                                                    R. R. BLAIR
                                               BY
                                                    ATTORNEY Patented Apr. 6, 1943

2,316,044

UNITED STATES PATENT OFFICE 2,316,044

ELECTRONIC APPARATUS

Royer R. Blair, Scotch Plains, N. J., assignor to Bell Telephone Laboratories, Incorporated, New York, N. Y., a corporation of New York Application October 18, 1941, Serial No. 415,574

7 Claims. (Cl. 250—27)

This invention relates to electronic apparatus, and more particularly to an arrangement for automatically equalizing the anode currents of two vacuum tubes having a common output.

In a familiar type of electronic apparatus, two vacuum tubes may be initially arranged such that the anode current of one is balanced against that of the other to indicate a condition of no signaling input thereto. As the characteristics of both tubes are usually different the anode circuit of one tube embodies a variable resistor to bring about such balance. An indicator connected to both tubes measures the balance of the anode currents of the two tubes. Thereafter, a certain unbalance between the anode currents of the two tubes is utilized to produce a given reading on the indicator to represent a given level of signaling waves; and variations of such unbalance are utilized to represent variations of the signaling waves relative to the normal level thereof. One difficulty with the operation of such apparatus is that errors may be inadvertently introduced in the readings of the indicator, due to changes of the characteristics of the vacuum tubes because of aging and variations of the potential of the sources effecting energization thereof. Checking the characteristics of the tubes and the accuracy of the potential sources is expensive from both the standpoint of time and the cost of replacements where necessary.

The present invention, therefore, contemplates electronic apparatus in which a balance between the anode currents of two vacuum tubes, or a predetermined calibration of the anode currents of two vacuum tubes, is automatically accomplished by utilizing a portion of the effective biasing potential for the control grid of each tube to adjust the effective biasing potential for the control grid of the other tube.

The main object of the invention is to balance automatically the anode currents of two vacuum tubes arranged with a common output circuit.

Another object is to maintain automatically a predetermined calibration of the anode currents of two vacuum tubes having a common output.

A further object is to compensate automatically for the aging of vacuum tubes and variations of the potentials of sources effecting energization thereof.

In a specific embodiment the present invention comprises a pair of vacuum tubes, each including a control grid, a cathode and an anode, arranged such that an input circuit is applied to one tube and the anode circuits of both tubes are connected to an indicator. A resistor individual to the cathode of each tube serves to apply a certain positive potential to this cathode, determined by the amount of the anode current in each tube. A conductive connection extending from corresponding points of the individual cathode resistors associated with each tube to the control grid of the other tube applies a preselected portion of the positive biasing potential due to the individual cathode resistor of each tube to counteract to a certain extent the effective negative biasing potential due to the individual cathode resistor of the other tube.

A feature of the invention is that, under a condition of no signaling input, the anode currents of both tubes tend automatically toward substantial equalization; and under a condition of predetermined calibration, the anode currents of both tubes tend automatically toward a certain unbalance, regardless of variations both in the characteristics of the tubes and in the potentials of the sources effecting energization thereof. A further feature relates to a reduction of the number of tube or other replacements, and therefore provides for an economy of circuit elements. Another feature involves an economy of time, as frequent checking operations of the tubes and potential sources are obviated. A still further feature is that such electronic apparatus is suitable for extensive use in the field, as the need for frequent checking and replacement of circuit elements is materially reduced.

The invention will be readily understood from the following description taken together with the accompanying drawing which illustrates a specific embodiment of the invention applied to a pair of vacuum tubes having a common output.

Referring to the drawing, a signaling input circuit 10 is impressed across the primary winding of an input transformer 11 whose secondary winding is applied by leads 15 and 16 across respective anode 12 and associated cathode 13 of a diode rectifier tube 14. This anode and cathode are connected by respective leads 17 and 18, the latter embodying a resistor 19, to a common point 20 which is extended over lead 21 to the control grid of vacuum tube 22. The other anode 23 and associated cathode 24 of the rectifier tube 14 are joined by respective leads 25 and 26, the latter embodying a resistor 27, to a common point 28 which is extended by lead 29 to the control grid of vacuum tube 30. Thus, it is seen that the input circuit 10 is effectively connected only to the control grid of the tube 22.

In series with the cathode of the tube 22 is a first plurality of fixed, series resistors 40, 41 and 42; and in series with the cathode of the tube 30 is a second plurality of fixed, series resistors 43, 44 and 45, and a variable resistor 46. The resistors 40 and 43 are equal; the resistors 41 and 44 are equal; and the resistor 42 equals the resistor 45 plus ½ × resistor 46, assuming the characteristics of both the tubes 22 and 30 to be identical which is a rare case. Normally, the value of the resistor 42 will be different from the value of resistor 45 plus the effective value of the resistor 46 because the characteristics of the tubes 22 and 30 are different. In view of such difference, the resistor 46 may be adjusted to a value which is larger or smaller than one-half its full effective value, depending on the characteristic of the tube 30 with respect to the characteristic of the tube 22. The anodes of the tubes 22 and 30 are joined by a lead 47. A source 48 of direct potential has its positive terminal connected by a lead 61 to a common point 62 embodied in the lead 47, and its negative terminal by a lead 65 to a point 64 which is common to corresponding terminating points 50 and 51 of the respective resistors 40 and 43, which negative terminal of the source 48 is also extended to a point 49 at ground potential.

Other corresponding points 52 and 53 of the respective first and second pluralities of cathode resistors are extended over respective leads 54 and 55 to an indicator 56. A lead 57 connects point 58 of the plurality of cathode resistors associated with the tube 30 to the cathode 13 of the rectifier tube 14, which cathode is joined in the manner previously pointed out to the control grid of the tube 22. A lead 59 connects point 60 of the plurality of cathode resistors associated with the tube 22 to the cathode 24 of the rectifier tube 14, which cathode is connected in the manner above-mentioned to the control grid of the tube 30.

In the operation of the circuit, a condition of no signaling waves in the input circuit 10 is first assumed so that the variable resistor 46 may be adjusted until the anode current of the tube 30 is rendered substantially equal to the anode current of the tube 22. As previously pointed out, such adjustment of the resistor 46 is necessary because the tubes 22 and 30 possess different characteristics. This results in the production of a zero reading on the indicator 56.

The anode current of the tube 22 flows in a circuit comprising a positive terminal of the source 48, lead 61, common point 62, upper portion of the lead 47, anode-cathode of the tube 22, resistors 42, 41 and 40, point 50, lead 63, common point 64, lead 65 and negative terminal of the source 48. The anode current of the tube 30 flows in a circuit embodying positive terminal of the source 48, lead 61, common point 62, lower portion of the lead 47, anode-cathode of the tube 30, adjustable resistor 46, resistors 45, 44 and 43, point 51, lead 66, common point 64, lead 65 and negative terminal of the source 48.

The cathodes of the tubes 22 and 30 are rendered effectively positive to amounts depending on the magnitudes of the potentials produced across the respective first and second pluralities of resistors as described above. In effect, the magnitudes of the effective negative potentials impressed on the control grids of both tubes 22 and 30 are determined by the characteristics thereof. At the same time the positive potential developed across the resistors 43 and 44 is applied to the control grid of the tube 22 over a circuit comprising point 58, lead 57, leads 16 and 18 including resistor 19, common point 20 and lead 21; and the positive potential developed across the resistors 40 and 41 is applied to the control grid of the tube 30 over a circuit embodying point 60, lead 59, lead 26 including resistor 27, common point 28, and lead 29.

Thus, the potential across both resistors 43 and 44 is impressed on the control grid of the tube 22 with a polarity which is opposite to that applied effectively thereto by the series resistors 40, 41 and 42; and the potential across both resistors 40 and 41 is applied to the control grid of the tube 30 with a polarity which is opposite to that effectively impressed thereon by the series resistors 43, 44, 45 and 46. Hence, the positive potential due to the series resistors 43 and 44 counteracts partially the effective negative biasing potential due to resistors 40, 41 and 42, and the positive potential due to the series resistors 40 and 41 counteracts partially the effective negative biasing potential due to the series resistors 43, 44, 45 and 46. The amounts of the counteracting potentials due to the respective resistor pairs 40 and 41 and 43 and 44 may or may not be equal with respect to each other, depending on the match of the characteristics of the tubes 22 and 30 as hereinbefore mentioned.

Next it will be assumed, under a condition of no signaling waves in the input circuit 10, that the anode current in the tube 22 is larger than the anode current of the tube 30. Thus, the magnitude of potential developed across the series resistors 40, 41 and 42 will be larger than that produced across the series resistors 43, 44, 45 and 46. The cathode of the tube 22 is therefore rendered more positive than is the cathode of the tube 30. At the same time both the resistors 40 and 41 supply a larger magnitude of counteracting potential to the control grid of the tube 30 than both the resistors 43 and 44 supply to the control grid of the tube 22. Consequently, the effective biasing potential impressed on the control grid of the tube 30 will be less than the effective biasing voltage impressed on the control grid of the tube 22.

In effect, a negative increment of biasing potential is applied to the control grid of the tube 22 and a positive increment of biasing potential is applied to the control grid of the tube 30. As a consequence of such variations of effective biasing potentials, the anode current of the tube 22 is decreased and that in the tube 30 is increased so that both anode currents will tend to be made more nearly equal than they would be, if a change of the anode current of one tube did not cause a change of the effective bias of the other tube as hereinbefore explained. By a similar procedure, the anode current of both tubes 22 and 30 can be shown to approach substantial equality automatically when the anode current of the tube 30 is initially larger than the anode current of the tube 22.

When signaling waves of a given level are impressed on the input circuit 10, the effective negative biasing potential impressed on the control grid of the tube 22 will be such as to decrease the anode current of this tube by a predetermined amount. This will cause a certain difference or unbalance between the anode currents of both tubes 22 and 30. Such unbalance produces a given reading on the indicator 56.

Thereafter, subsequent variations of the level of the signaling waves in the input circuit 10 will cause variations of the unbalance between the anode currents of the tubes 22 and 30, which variations of anode current unbalance produce corresponding changes in the readings of the indicator 56 with respect to the above-mentioned given reading thereon.

In the latter connection, a given level of signals in the input circuit 10 would cause a smaller unbalance between the anode currents of the tubes 22 and 30 than such level of input signals would cause if the conventional arrangement of completely independent biases were employed for the control grids of the two tubes. This is so for the reason that when the anode current of the tube 22 is reduced by the presence of the signal in the input circuit 10, the anode current of the tube 30 is also reduced, due to the increased effective negative bias on control grid thereof caused by the lower positive potential developed across both resistors 40 and 41 and utilized, as hereinbefore pointed out, to counteract the potential effected across the series resistors 43, 44, 45 and 46.

It would appear, therefore, that for a certain unbalance between anode currents, that is, for such unbalance as to produce a given reading on the indicator 56, the level of signals in the input circuit 10 would be larger for the biasing arrangement herein described than that required if the biases of the two tubes were independent of each other. However, such loss of sensitivity is accompanied by a stabilization of the calibration of the indicator 56, which calibration effects for a given level of signals in the input circuit 10 a given reading on the indicator 56. Thus, any change of the unbalance of the anode currents of the tubes 22 and 30, and therefore any change of the given reading on the indicator 56 due to a shift in the characteristic of either tube 22 or 30 occasioned by aging or variations of the energizing voltages, would be substantially obviated. This occurs for the reason that any change of the anode current of one tube tends to alter the effective negative bias of the other tube in such way as to effect a compensating change of the anode current of the other tube.

In such compensation, for example, a decrease of the anode current of tube 22 would be accompanied by a corresponding decrease of the anode current of the tube 30, and vice versa; and an increase of the anode current of the tube 22 would be accompanied by a corresponding increase of anode current of the tube 30, and vice versa. This is occasioned by the variations of the potentials developed across the resistor pairs 40 and 41 and 43 and 44 and utilized as counteracting potentials in the manner previously pointed out. As a consequence, the given reading on the indicator 56 due to a given level of signals in the input circuit 10 is maintained substantially independent of changes in the tube characteristics and variations of the voltages of the energizing sources.

Thus, the invention as hereinbefore described tends to equalize the anode currents of both tubes 22 and 30 under a condition of no signaling waves in the input circuit 10, and also tends to maintain a predetermined calibration or unbalance between the anode currents of both tubes 22 and 30 under a condition of a given level of signaling waves in the input circuit 10, regardless of the aging of the tubes 22 and 30, variations of the voltages effecting the energization thereof, and other circuit variables over which it is difficult to exercise a precise and continuous control.

Although the invention is described with respect to a three-electrode tube, it is not necessarily limited thereto, and it is to be understood that it may be expeditiously employed with electronic tubes having any desired number of electrodes. In connection with the latter type tubes, the space current may include components from the several grids together with the component from the anode.

What is claimed is:

1. In an electrical system, a pair of vacuum tubes, each tube including a control grid, a cathode and an anode, means individual to each cathode to apply thereto a positive biasing potential and thereby an effective negative biasing potential to the associated control grid determined by the anode current in each tube, an output circuit connected between one point on said individual cathode biasing means of one tube and a further point on said individual cathode biasing means of the other tube, and circuit means to connect a corresponding point of said individual cathode biasing means of each tube to the control grid of the other tube to utilize a portion of the positive cathode biasing voltage of each tube to counteract the effective negative biasing voltage applied to the control grid of the other tube to equalize substantially the anode currents of both said tubes.

2. In an electrical system, a pair of vacuum tubes, each tube including a control grid, a cathode and an anode, an input circuit for one only of said tubes, a common output circuit for both tubes, resistance means individual to the cathode of each tube to apply to the control grid associated therewith an effective negative biasing potential determined by the anode current in each tube, and circuit means extending from a corresponding point of said resistance means of each tube to the control grid of the other tube so that a difference between the anode currents of both tubes causes effectively a positive increment of biasing potential to be applied to the control grid of the tube having the smaller anode current and a negative increment of biasing potential to be applied to the control grid of the tube having the larger anode current.

3. In an electrical system, a pair of vacuum tubes, each tube including a control grid, a cathode, and an anode, means individual to the cathode of each tube to apply thereto a biasing voltage determined by the anode current thereof, an input circuit for one of said tubes, an output circuit connected to corresponding points of both said individual biasing means, and circuit means to connect another corresponding point of each of said individual biasing means to the control grid of the other tube so that biasing voltages are applied effectively to the control grids of both said tubes with such magnitudes as to equalize substantially the anode currents thereof.

4. In combination in an electrical circuit, a pair of vacuum tubes, each tube embodying a control grid, a cathode and an anode, an input circuit for one of said tubes, a source of direct potential to energize the anode-cathode circuits of both said tubes, a resistor individual to the cathodes of both said tubes to apply to each cathode a positive potential determined by the anode current in each tube, an output circuit connected to corresponding points of said resistors and responsive to the anode currents of both said tubes, and a conductive connection extending from other corresponding points of the individual resistor of each tube to the control grid of the other tube to apply to the latter control grid a potential to counteract partially the potential applied to the cathode associated therewith so that the anode currents of both said tubes are substantially equalized, the conductive connection extending from the other tube to said one tube being also connected to said input circuit.

5. In combination in an electrical circuit, a pair of vacuum tubes, each embodying a control grid, a cathode and an anode, rectifier means embodying two anodes and two cathodes, circuit means to connect each anode of said rectifier means to the control grid of one of said vacuum tubes, a source of direct potential having its positive and negative terminals connected to the respective anodes and cathodes of both said vacuum tubes, resistance means individual to the cathodes of both said vacuum tubes to apply to each cathode a positive potential whose magnitude is determined by the anode current in each of said vacuum tubes, a variable resistor connected in series with said resistance means of one of said vacuum tubes to render initially the anode current thereof substantially equal to the anode current of the other vacuum tube, an input circuit connected across one anode and associated cathode of said rectifier means to vary the anode current of the vacuum tube whose control grid is connected to said one anode of said rectifier means, a load circuit connected to corresponding points of said resistance means of both said vacuum tubes and responsive to the anode currents thereof, and a conductive connection extending from another corresponding point of each of said resistance means to both the control grid of the other tube and the cathode of said rectifier tube whose associated anode is also connected to the control grid of said other vacuum tube so as to apply to the control grid of each tube a portion of the biasing voltage produced by the resistance means of the other tube.

6. In combination in an electrical circuit, a pair of vacuum tubes, each embodying a control grid, a cathode and an anode, a source of positive potential to energize said anodes, resistance means individual to said cathodes to apply thereto positive potential determined by the anode current of the associated tubes such that the anode current of each tube is initially substantially balanced against the anode current of the other tube, an input circuit applied to the control grid and cathode of one tube, a load circuit connected to corresponding points of both said individual cathode resistance means and responsive to the anode current of both said tubes, and a conductive connection extending from another corresponding point of said individual cathode resistance means of each tube to the control grid of the other tube to apply a portion of the positive cathode potential of each tube to the control grid of the other tube so that unbalance between the anode currents of both said tubes is controlled substantially entirely by the voltage in said input circuit, the conductive connection extending between the control grid of the one tube connected to said input circuit and the resistance means of the other tube being also connected to one side of said input circuit.

7. In an electrical system, a pair of vacuum tubes, each including a control grid, a cathode and an anode, means individual to the cathode of each tube to balance initially substantially the anode currents of both said tubes with respect to each other in response to the anode current of individual tubes, an input circuit applied to the control grid and cathode of one of said tubes, an output circuit connected to certain points of both said individual cathode means, and circuit means to connect a certain other point of said individual cathode means of each tube to the control grid of the other tube to control the anode currents of both said tubes such that a voltage of given magnitude in said input circuit causes substantially a certain unbalance between the anode currents of both said tubes and variations of the given voltage cause corresponding variations of the unbalance between the anode currents of both said tubes with respect to the certain unbalance.

ROYER R. BLAIR.